(12) United States Patent
Yoo et al.

(10) Patent No.: US 8,972,280 B2
(45) Date of Patent: Mar. 3, 2015

(54) METHOD AND APPARATUS FOR CONTROLLING A PUBLIC DEVICE

(75) Inventors: Sang-hyun Yoo, Seoul (KR); Jae-cheol Lee, Seoul (KR); Sang-dok Mo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 13/278,476

(22) Filed: Oct. 21, 2011

(65) Prior Publication Data

US 2012/0232677 A1    Sep. 13, 2012

(30) Foreign Application Priority Data

Mar. 8, 2011   (KR) .................. 10-2011-0020617

(51) Int. Cl.
*G06Q 30/00* (2012.01)
*G05B 19/18* (2006.01)
*G05B 15/02* (2006.01)
*G05B 11/01* (2006.01)
*G08C 17/00* (2006.01)
*H04W 4/02* (2009.01)
*H04W 4/20* (2009.01)
*H04L 29/08* (2006.01)

(52) U.S. Cl.
CPC .............. *G08C 17/00* (2013.01); *H04W 4/021* (2013.01); *H04W 4/206* (2013.01); *H04L 67/2819* (2013.01); *H04L 67/12* (2013.01); *H04L 67/2833* (2013.01); *G08C 2201/40* (2013.01); *G08C 2201/91* (2013.01)
USPC .................. 705/14.55; 705/14.61; 705/14.64; 705/14.73; 700/4; 700/9; 700/17; 700/19; 700/20

(58) Field of Classification Search
CPC ... G06Q 30/0241; G06Q 10/02; H04H 60/48; H04H 60/59; H04H 60/63; H04H 60/66; H04H 60/64; H04H 60/65; H04H 60/91; H04N 2007/17381; H04N 2007/1739; H04N 21/4126; H04N 21/812; G09F 27/00; G08C 17/00; G08C 2201/42; G08C 2201/93
USPC ........... 700/2, 4, 9, 11, 17, 19, 20; 705/14.55, 705/14.49, 14.4, 1.1, 14.61, 14.64, 14.73; 455/344, 130, 3.01, 3.03–3.06, 39, 455/66.1
See application file for complete search history.

(56) References Cited

U.S. PATENT DOCUMENTS

| 7,349,668 | B2 * | 3/2008 | Ilan et al. ............ 455/66.1 |
| 8,068,781 | B2 * | 11/2011 | Ilan et al. ............ 455/3.01 |
| 2003/0149601 | A1 * | 8/2003 | Cabral .................. 705/5 |
| 2008/0238889 | A1 * | 10/2008 | Thorne ............... 345/204 |
| 2009/0265243 | A1 * | 10/2009 | Karassner et al. ...... 705/14.54 |
| 2010/0161424 | A1 | 6/2010 | Sylvain |

FOREIGN PATENT DOCUMENTS

| CN | 101616293 A | * 12/2009 |
| KR | 10-2000-0063984 A | 11/2000 |
| KR | 10-2006-0063004 A | 6/2006 |

(Continued)

*Primary Examiner* — Crystal J Barnes-Bullock
(74) *Attorney, Agent, or Firm* — NSIP Law

(57) ABSTRACT

Provided are a method and apparatus for controlling a public device that provides services that are shared by a plurality of users. The plurality of users may control an operation of the public device in order to provide a public service desired by the users.

15 Claims, 7 Drawing Sheets

(56) References Cited

FOREIGN PATENT DOCUMENTS

| KR | 10-2008-0041083 A | 5/2008 |
|---|---|---|
| KR | 10-0834046 B1 | 5/2008 |
| KR | 10-2009-0125498 A | 12/2009 |
| KR | 10-2010-0043753 A | 4/2010 |

* cited by examiner

METHOD AND APPARATUS FOR CONTROLLING A PUBLIC DEVICE

CROSS-REFERENCE TO RELATED APPLICATION(S)

This application claims the benefit under 35 U.S.C. §119 (a) of Korean Patent Application No. 10-2011-0020617, filed on Mar. 8, 2011, in the Korean Intellectual Property Office, the entire disclosure of which is incorporated herein by reference for all purposes.

BACKGROUND

1. Field

The following description relates to methods and apparatuses for controlling a public device.

2. Description of the Related Art

There are various public devices that may be used to provide public services in crowded places. For example, a public device may be used to provide a public service that is shared by users at the same time and/or in the same place. Examples of a public device include a temperature adjusting apparatus for providing cool air or hot air so as to make a more comfortable environment in a crowded place, a sound reproducing apparatus for providing sound so that people may listen to news and music, an image reproducing apparatus for providing images to people so as to advertise, and the like.

Typically a person owns or uses at least one user terminal such as a smart phone, a laptop computer, a tablet, and the like. A user terminal has various functions such as a function of searching for, transmitting, and receiving information on the Internet, a function of reproducing multimedia contents, a function of receiving and editing a photo, and the like. As the technology continues to develop, various kinds of user terminals and various additional services will likely be developed, and people will inevitably continue to use at least one user terminal.

SUMMARY

In one general aspect, there is provided an apparatus for controlling at least one public device that provides a public service that is shared by users, the apparatus including a receiver configured to receive, from a plurality of user terminals, a plurality of pieces of information for controlling an operation of the at least one public device, corresponding to a public service that is requested by users of the plurality of terminals, a data stream generator configured to integrate the plurality of pieces of information for controlling an operation of the at least one public device, and for generating the information in the form of a data stream, and a transmitter configured to transmit the data stream generated by the data stream generator to the at least one public device.

The at least one public device may comprise a plurality of public devices, and the apparatus may further comprise a sorter configured to sort a plurality of pieces of information for controlling an operation of the plurality of public devices into information for controlling an operation of a respective public device, prior to generating the information in the form of a data stream.

The apparatus may further comprise a database connected to the data stream generator and the sorter, the database is configured to transmit and receive information to and from the data stream generator and the sorter, and to store information for identifying the at least one public device and operation menu information indicating a list of options for controlling the at least one public device, and an extractor configured to extract the operation menu information from the database, using the information for identifying the at least one public device that is received from a user terminal, and to transmit the operation menu information to the transmitter.

The transmitter may be configured to receive the operation menu information from the extractor, and transmit the operation menu information to the user terminal that transmits the information for identifying a public device.

The apparatus may further comprise an inserting unit configured to receive information indicating a result of controlling an operation of the at least one public device, from the receiver, and to input the information indicating a result of controlling the operation of the at least one public device to the database, wherein the receiver is configured to receive the information indicating a result of controlling the operation of the at least one public device from a public device.

The receiver may be configured to receive a user's opinion about public services provided by the at least one public device, and the inserting unit may be configured to receive the user's opinion from the receiver, and input the user's opinion to the database.

The extractor may be configured to extract the user's opinion that is stored in the database, and the transmitter may be configured to transmit the user's opinion to the user terminal.

The apparatus may further comprise a determination unit configured to analyze the information in the form of data stream generated by the data stream generator, to determine final control information that is used to control an operation of the at least one public device, in consideration of priority and a frequency, and to transmit the final control information to the transmitter, wherein the transmitter is configured to transmit the final control information to the public device.

In another aspect, there is provided a method of controlling at least one public device that provides a public service that is shared by users, the method including receiving, from a plurality of terminals, a plurality of pieces of information for controlling an operation of the at least one public device, corresponding to a public service that is requested by users of the plurality of terminals, integrating the plurality of pieces of information for controlling an operation of the at least one public device, and generating the information in the form of a data stream, and transmitting the data stream to the at least one public device.

The at least one public device may comprise a plurality of public devices, and the method may further comprise sorting the plurality of pieces of information for controlling an operation of the plurality of public devices into information for controlling an operation of a respective public device prior to generating the information in the form of a data stream.

The method may further comprise storing information for identifying the at least one public device and operation menu information indicating a list of options for controlling the at least one public device, in a database, receiving the information for identifying the at least one public device from a user terminal, and extracting the operation menu information from the database, using the information for identifying at least one public device, and transmitting the operation menu information indicating a list of options for controlling at least one public device to a transmitter.

The information for identifying at least one public device may be obtained using the user terminal.

The method may further comprise receiving information indicating a result of controlling an operation of the at least one public device from a public device, and inputting the information indicating the result of controlling an operation of the at least one public device to a database.

The method may further comprise receiving a user's opinion about public services provided by the at least one public device, and inputting the user's opinion to a database.

The method may further comprise extracting the user's opinion that is stored in the database, and transmitting the user's opinion to a user terminal.

The method may further comprise analyzing the information in the form of a data stream to determine final control information that is used to control an operation of the at least one public device, in consideration of priority and a frequency, and transmitting the final control information to the public device.

In another aspect, there is provided a computer-readable storage medium having stored therein program instructions to cause a processor to implement a method of controlling at least one public device that provides a public service that is shared by a plurality of users, the method including receiving, from a plurality of terminals, a plurality of pieces of information for controlling an operation of the at least one public device, corresponding to a public service that is desired by each respective user of the plurality of terminals, integrating the plurality of pieces of information for controlling an operation of the at least one public device to generate the information in the form of a data stream, and transmitting the data stream to the at least one public device.

In another aspect, there is provided a terminal for controlling a public device via a public device control apparatus, the terminal including an input unit configured to receive a user input identifying the public device and/or to select information for controlling the public device, and a communication unit configured to transmit the user input to the public device control apparatus to enable the public device control apparatus to control the public device.

The communication unit may be further configured to receive operation menu information indicating a list of options for controlling the public device, from the public device control apparatus, and the input unit may be further configured to receive a user input based on the operation menu information.

The terminal may further comprise a recognition module configured to recognize and obtain information for identifying and distinguishing the public device.

The recognition module may be configured to recognize and obtain at least one of a quick response code, a bar code, and a radio frequency identification (RFID) tag, from the public device.

The public device control apparatus may be wirelessly connected to the public device, the terminal may be wirelessly connected to the public device control apparatus, and the terminal may be configured to wirelessly control the public device via the public device control apparatus.

Other features and aspects may be apparent from the following detailed description, the drawings, and the claims.

Figure 1:
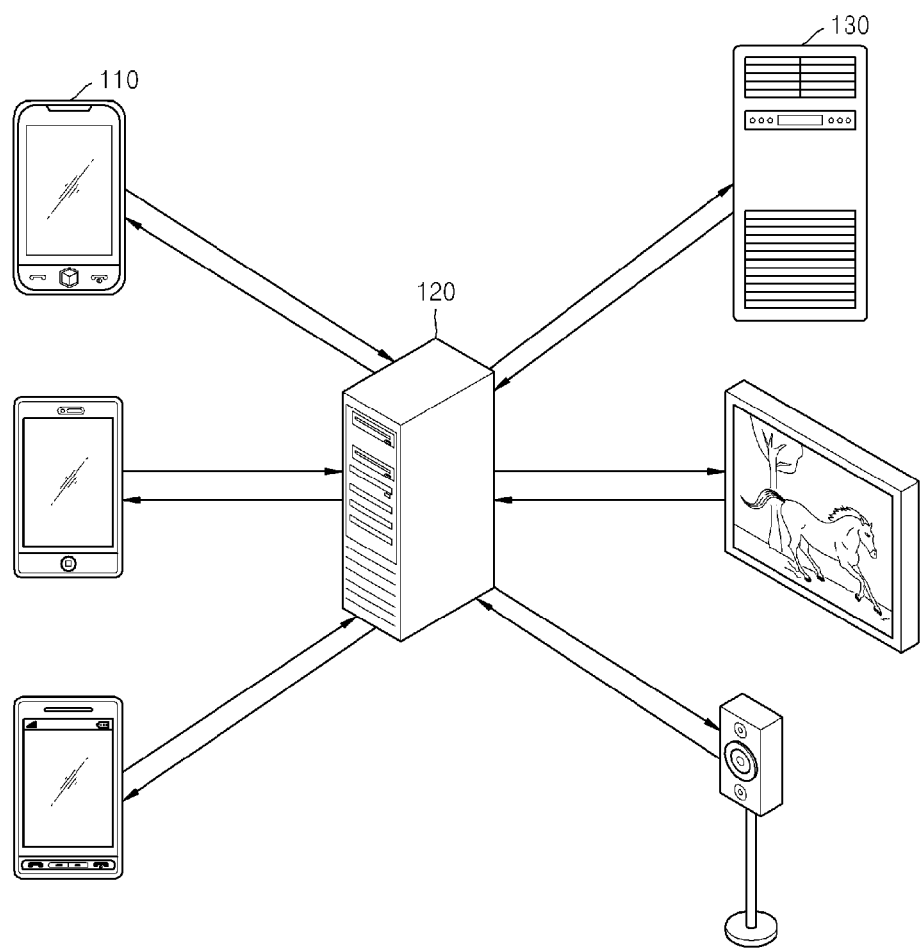
FIG. 1 is a diagram illustrating an example of a relationship of a user terminal, a public device, and a public device controlling apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The following description relates to methods and apparatuses for controlling a public device. Various matters that are thought to be known to one of ordinary skill may be omitted herein for convenience.

As described in various examples, a public device may refer to a device that provides a service that may be shared by users at the same time and/or in the same place. For example, the public device may be a temperature adjusting apparatus for providing cool air or hot air, a sound reproducing apparatus for providing sound so that people may listen to various sounds such as the news or music, an image reproducing apparatus for providing images such as advertisements, and the like.

FIG. 1 illustrates an example of a relationship of a user terminal 110, a public device 130, and a public device controlling apparatus 120.

Referring to FIG. 1, a public device controlling apparatus 120 may be connected to a plurality of user terminals 110 and a plurality of public devices 130. For example, the public device controlling apparatus 120 and the public devices 130 may be physically separated from each other, and may be connected via various communication networks such as a wired or wireless connection. As another example, the public device controlling apparatus 120 and the public device 130 may be integrated with each other.

Figure 2:
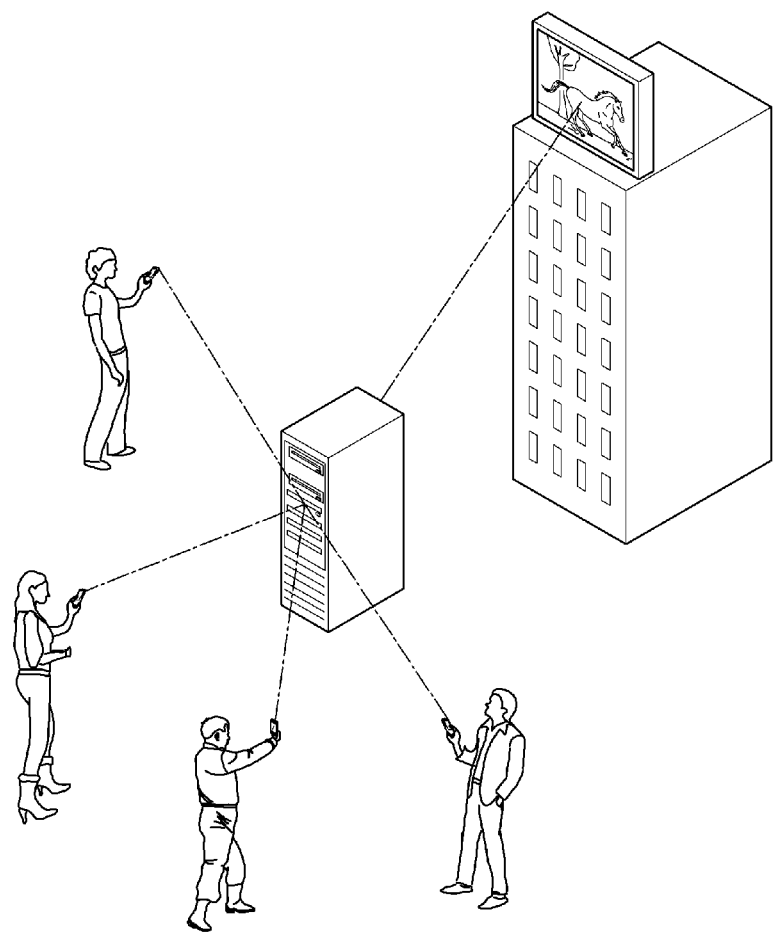
FIG. 2 is a diagram illustrating an example in which a public device is controlled.

FIG. 2 illustrates an example in which a public device is controlled.

Referring to FIG. 2, users reflect their requests to an image reproducing apparatus that has a large-sized screen by controlling the image reproducing apparatus using their respective user terminals. If a user who is looking at the large-size screen desires to change a current image to another image, the user may request a public device controlling apparatus to show the other image desired by the user on the screen. The public device controlling apparatus may process the request and transmit control information to the image reproducing apparatus having the large-sized screen. As another example, the users may know the opinions or thoughts of other users because the users may state their views and may exchange opinions with the other users through a social networking service between the user terminals and the public device controlling apparatus. For example, if a user wants to change the current image that is being displayed on the large-size screen to another image, the user may exchange opinions with other users. As another example, if the user wants to change the brightness of an image, sound, or the like, the user may exchange opinions with other users and may control the public device.

Figure 3:
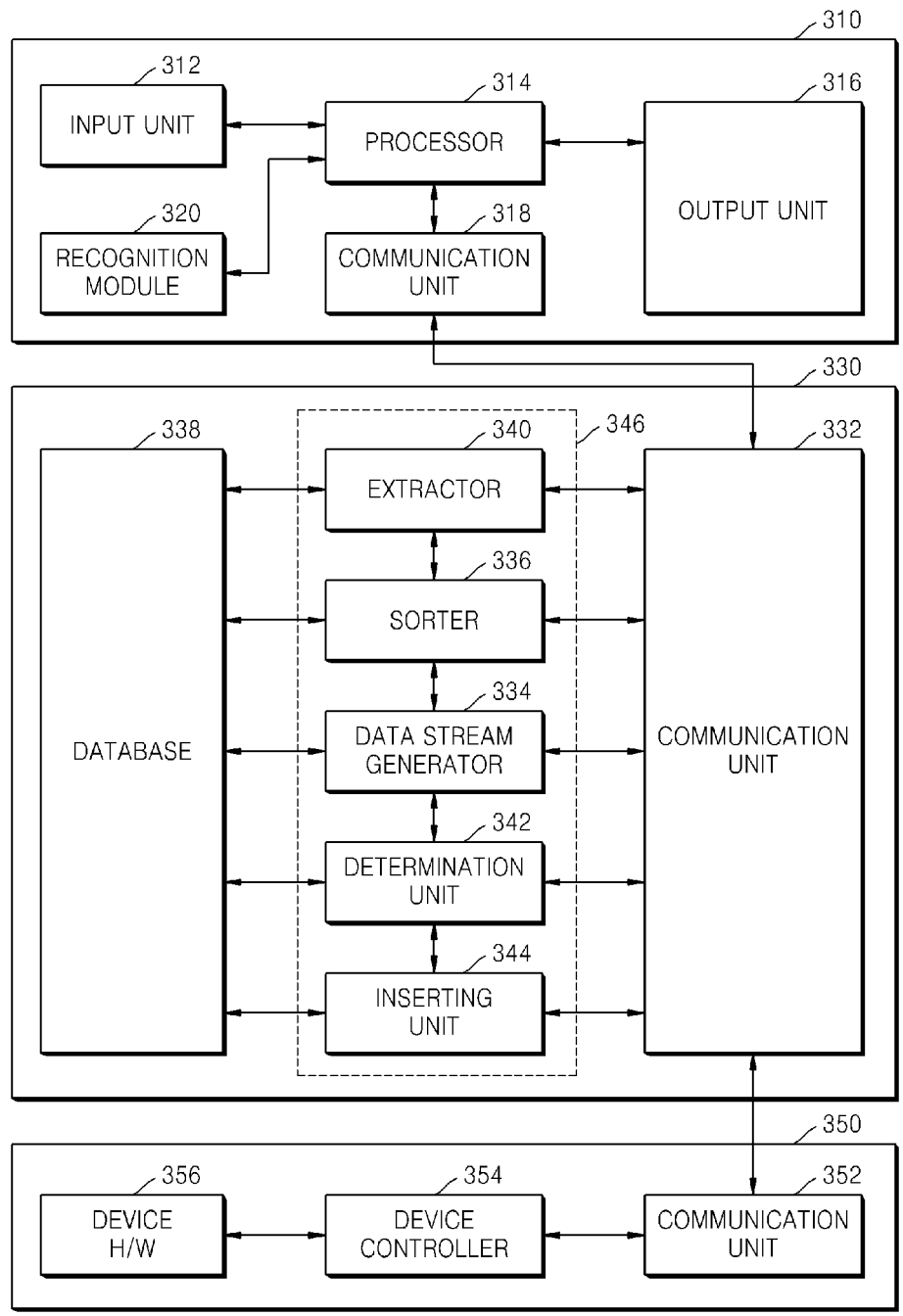
FIG. 3 is a diagram illustrating an example of a public device controlling apparatus.

FIG. 3 illustrates an example of a public device controlling apparatus 330.

Referring to FIG. 3, an operation of controlling a public device 350 is performed by a user terminal 310, the public device controlling apparatus 330, and the public device 350. In this example, the user terminal 310 includes an input unit 312, a processor 314, an output unit 316, a communication unit 318, and a recognition module 320. The public device controlling apparatus 330 includes a communication unit 332, a database 338, and a device controlling processor 346. In this example, the device controlling processor 346 includes a data stream generator 334, a sorter 336, an extractor 340, a determination unit 342, and an inserting unit 344. The public device 350 includes a communication unit 352, a device controller 354, and device hardware (H/W) 356.

The input unit 312 of the user terminal 310 may be used by a user to input information, for example, information for identifying the public device 350 or to select information for controlling an operation of a public device 350. For example, the user may select a public service desired by the user from operation menu information indicating a list of options for controlling operations of the public device 350. In this example, the operation menu information may be checked on the output unit 316. As another example, the input unit 312 may be used to reflect a user's opinion during use of the user terminal 310. The input unit 312 may be of any type that is used in a user terminal, such as a keypad, a touchpad, an electrostatic touch type or button type, a piezoelectric touch type or button type, and the like.

The processor 314 is a module that may be used to process events that occur in the user terminal 310. For example, the processor 314 may receive and process information from the input unit 312 and/or the communication unit 318, and transmit the information to the output unit 316 and/or the communication unit 318. The output unit 316 may be any type unit or display by which a user may recognize information, for example, a liquid crystal display (LCD), a light emitting diode (LED) display, and the like. The communication unit 318 may transmit and receive information to and from the public device controlling apparatus 330. The communication unit 318 may transmit information that is generated by the input unit 312 to the public device controlling apparatus 330, or on the other hand, may receive information that is transmitted from the public device controlling apparatus 330 and transmit the received information to the processor 314.

The recognition module 320 may be used to recognize and obtain information for identifying the public device 350. For example, the information for identifying the public device 350 may refer to unique information indicating various methods of identifying the public device, such as Quick Response Code, Bar Code, Radio Frequency Identification Tag, Serial Number, an augmented reality method for recognizing a public device using an image of the public device or global positioning system (GPS), and the like. The recognition module 320 may recognize and obtain information for distinguishing public devices and identifying the public device 350. For example, a user may directly input the information for identifying the public device 350 through the input unit 312 of the user terminal 310, or alternatively, may obtain and use specific identification information of the public device 350 by scanning the information for identifying the public device 350 using a camera module or the recognition module 320 that has a different function from the camera module. In addition, in order to increase a recognition rate of the public device 350, multiple kinds of information for identifying a public device may be input and used together.

In addition to the above-described examples for identifying the public device 350, examples of information for controlling a public device may include operation menu information that includes a list of options for controlling an operation of a public device, information for controlling an operation of a public device so as to provide a public service desired by users, a data stream as a group of information for controlling an operation of a public device, final control information, address information of a public device, information indicating a result after an operation of a public device is controlled, information about a state of a public device, and the like. For example, if a public device is a large-size cooler, operation menu information may indicate a list of options for increasing or reducing a temperature, options for increasing or reducing an air flow rate of the cooler, and the like.

The information for controlling an operation of a public device refers to an option that is selected by users from among options, and for example, may be an option of increasing a temperature of the cooler by 3° C. The data stream refers to option information that is formed by integrating pieces of option information selected by users. For example, if user 1 selects an option for increasing a temperature by 3° C., user 2 selects an option for increasing a temperature by 1° C., user 3 selects an option for reducing a temperature by 2° C., and user 4 selects an option for increasing a temperature by 1° C., the data stream refers to information that is formed by integrating all pieces of option information indicating an increase of 3° C., an increase of 1° C., an increase of 1° C., and a reduction of 2° C. The final control information may be determined using integration information of a data stream and may be used to control an operation of a public device.

In the above-described example, an increase of 1° C., which is highest in frequency, may be the final control information. The information indicating a result refers to information indicating that the large-size cooler operates or a detected temperature is increased by 1° C. when the large-size cooler operates according to the final control information. The information about a state of a public device may include user opinions about public services that are provided by the public device. In the above-described example, the information about a state of a public device may be information indicating that a target temperature that is set in the cooler is too high or too low, or information indicating that the air flow rate of the cooler is too high or low. With regard to the above-described information, an example of how to transmit or use the information is described below.

The communication unit 332 of the public device controlling apparatus 330 may transmit and receive information to and from the user terminal 310 and the public device 350. That is, the communication unit 332 may include a transmitter and a receiver. If information for identifying the public device 350 is transmitted from the user terminal 310, the communication unit 332 may receive and transmit the information to the extractor 340. As another example if the public device controlling apparatus 330 transmits operation menu information indicating a list of options for controlling an operation of a predetermined public device to the user terminal 310, the communication unit 332 may transmit the operation menu information to the communication unit 318 of the user terminal 310.

As another example, the communication unit 332 may receive information about a state of a public device regarding user opinions about public services from the user terminal 310, or may transmit information about a state of another public device, which is stored in the public device controlling apparatus 330, to the user terminal 310. The communication unit 332 is connected with the communication unit 352 of the public device 350. The public device controlling apparatus 330 may process information for controlling operations of a plurality of public devices, which is received from the user terminal 310. The communication unit 332 may transmit the information to the public device 350. As another example, if the communication unit 332 of the public device controlling apparatus 330 receives the information indicating a result after an operation of a public device is controlled from the public device 350, the communication unit 332 of the public device controlling apparatus 330, which is also connected to the communication unit 352 of the public device 350, may receive the information.

The data stream generator 334 may generate a plurality of pieces of information for controlling an operation of the public device 350, which are received from a plurality of terminals, in the form of a single data stream. For example, if an amount of information of the data stream reaches a predetermined level, or a predetermined time elapses, the generation of a single data stream may be finished. The data stream may be stored in the database 338, or may be transmitted to the determination unit 342 or the communication unit 332.

The sorter 336 may sort a plurality of pieces of information that are received from the user terminal 310, according to attributes of a public device, such as information for identifying a public device. If the public device controlling apparatus 330 is used to control a single public device 350 only, the sorter 336 does not have to sort data. However, if the public device controlling apparatus 330 controls a plurality of public devices, the sorter 336 may sort data.

For the public device controlling apparatus 330 to control the public device 350, the public device controlling apparatus 330 may identify whether a public device is to be controlled by the public device controlling apparatus 330. As another example, the public device controlling apparatus 330 may obtain information about operations of a public device that are to be controlled by the public device controlling apparatus 330. As another example, the public device controlling apparatus 330 may obtain information about an address of a public device, for example, an Internet protocol (IP) address in order to transmit control information to the public device. In this example, the database 338 may store the information related to the public device 350, for example, information for identifying the public device 350, menu information indicating a list of options for controlling an operation of the public device 350, address information of the public device 350, and the like.

A manufacturer of the public device 350 may generate various data, for example, information for identifying the public device 350, information of an address of the public device 350, menu information indicating a list of options for controlling an operation of the public device 350, and the like. The information may be generated in the form of data that is previously determined by a manufacturer, or the like, in the public device controlling apparatus 330. If the manufacturer of the public device 350 registers the various data in the public device controlling apparatus 330, the various data may be stored in the database 338. As another example, information other than information related to the public device 350 may be stored in the database 338. For example, the database 338 may store information that is generated or used by processors that are installed in the public device controlling apparatus 330, or the information about a state of a public device regarding user opinions about public services that are provided by the public device.

The extractor 340 may check whether information about control of a public device, for example, operation menu information indicating a list of options for controlling the public device which is received from the user terminal 310, is stored in the database 338. If the operation menu information is stored in the database 338, the extractor 340 may extract the operation menu information from the database 338. Otherwise, if the operation menu information is not stored in the database 338, or the information for identifying a public device has an error, the extractor 340 may extract error message information for notifying a user about the error. As another example, the extractor 340 may extract the information about user opinions about public services provided by the public device, from the user terminal 310. Furthermore, the extractor 340 may extract the information about control of a public device, which is stored in the database 338.

The determination unit 342 may determine the final control information that is used to control the public device 350 based on priority, frequency, and/or the like, from among information that is generated by the data stream generator 334. For example, the information in the form of a data stream may be transmitted from the data stream generator 334 to the determination unit 342. The determination unit 342 may collect the information for a predetermined period, and analyze the information. If priority is to be considered, the final control information may be determined according to the priority. If priority is not to be considered, the information may be collected, and information for controlling an operation of a public device, which is selected by most users, may be determined as the final control information.

As an example, the determination unit 342 may be a processor that is installed in the public device controlling apparatus 330, or in the public device 350. That is, if the determination unit 342 is installed in the public device 350, the public device controlling apparatus 330 may transmit information in the form of a data stream to a public device. On the other hand, if the determination unit 342 is not installed in the public device 350, the public device controlling apparatus 330 may include the processor, that is, the determination unit 342, so as to transmit the final control information determined by the determination unit 342 to the public device 350.

The information indicating a result of the public device 350 being controlled may be transmitted from the public device 350. The inserting unit 344 may input the information indicating a result to the database 338. As another example, the inserting unit 344 may input information about a state of a public device regarding user opinions about public services to the database 338.

The communication unit 352 of the public device 350 may communicate with the public device controlling apparatus 330, and receive information in the form of a data stream or the final control information. The communication unit may transmit the information indicating a result of the public device 350 being controlled to the public device controlling apparatus 330. The device controller 354 may control the device H/W 356 according to the final control information. The device H/W 356 may be changed according to the type of the public device 350. For example, if the public device 350 is an image reproducing apparatus for displaying advertisements, the device H/W 356 may be a display unit. If the public device 350 is a temperature adjusting apparatus such as a fan heater or an air conditioner, the device H/W 356 may be a heater or air cooler.

Figure 4:
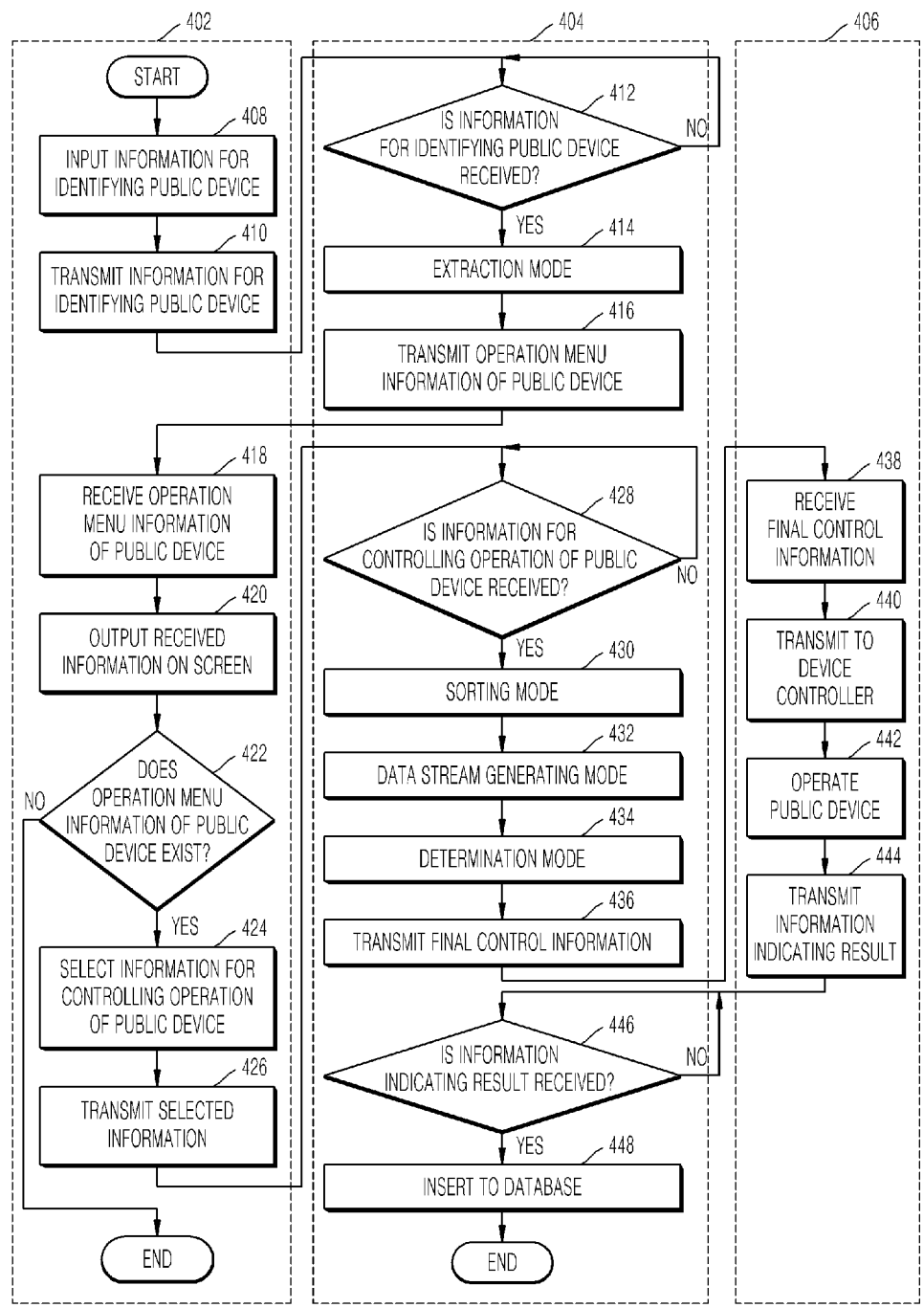
FIG. 4 is a flowchart illustrating an example of a method of controlling a public device.

FIG. 4 illustrates an example of a method of controlling a public device 406.

In this example, FIG. 4 shows the method according to a flow of information process between a user terminal 402, a public device controlling apparatus 404, and the public device 406. Hereinafter, although not described, the public device controlling apparatus 330 may also be used in the method.

In 408, input information for identifying a public device is received. For example, a user may directly input the information for identifying a public device to the user terminal 402, or alternatively, the apparatus may obtain and input the information for identifying a public device using the recognition module 320 of the user terminal 402. As another example, in order to increase a recognition rate of the public device 406, two or more kinds of information for identifying a public device may be input and used together.

In 410, the user terminal 402 attempts to transmit the information for identifying a public device. In this example, the information for identifying a public device may be input directly by the user from the input unit 312 of the user terminal 402, or may be obtained by the recognition module 320.

In 412, the public device controlling apparatus 404 checks whether the information for identifying a public device is transmitted from the user terminal 402. If the information for identifying a public device is transmitted from the user terminal 402, the public device controlling apparatus 404 receives the information for identifying a public device.

In 414, an extractor extracts information about control of a public device, for example, operation menu information indicating a list of options for controlling an operation of the public device from a database. An example of extracting information is described with reference to FIG. 5.

Figure 5:
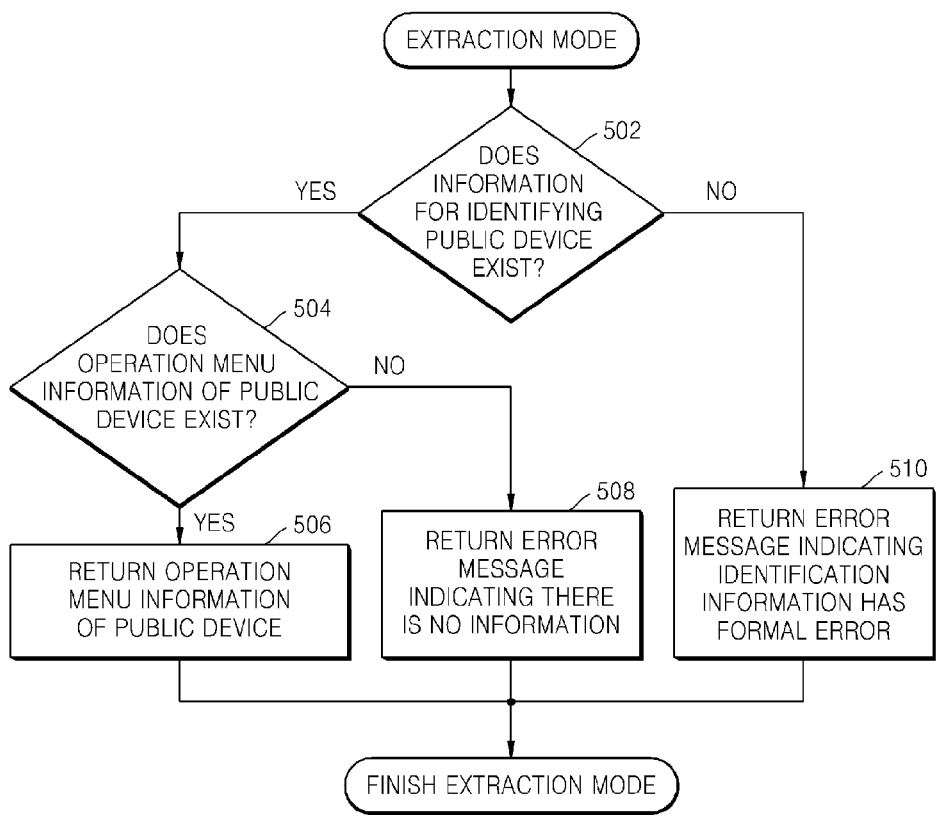
FIG. 5 is a flowchart illustrating an example of an extraction mode corresponding to an operation of FIG. 4.

FIG. 5 illustrates an example of an extraction mode corresponding to operation 414 of FIG. 4. In 502, the information for identifying a public device, which is received from the user terminal 402, is compared with information for identifying a public device that is stored in the database 338 (hereinafter referred to as identification information). If the identification information stored in the database 338 is identical to the information for identifying a public device that is received from the user terminal 402, whether operation menu information indicating a list of options for controlling an operation of a public device exists in the database 338 is determined, in 504. If the operation menu information exists in the database 338, the operation menu information is extracted from the database 338 and is transmitted to the communication unit 332, in 506. Otherwise, if the operation menu information does not exist in the database 338, error message information for notifying a user about this situation is extracted and is transmitted to the communication unit 332, in 508. In 502, if there is no identification information stored in the database 308 that is identical to the information for identifying a public device that is received from the user terminal 402, error message information indicating that the information for identifying a public device has an error is extracted and is transmitted to the communication unit 332, in 510.

Referring again to FIG. 4, in 416, the communication unit 332 transmits the operation menu information indicating a list of options for controlling an operation of a public device, which is obtained by the extractor 340, to the user terminal 402 that transmits the information for identifying a public device in 410.

In 418, the user terminal 402 receives the operation menu information from the public device controlling apparatus 404, in response to the information for identifying a public device that is transmitted from the user terminal 402.

In 420, the operation menu information is displayed on a screen of the user terminal 402 so that a user may see the operation menu information that is received from the public device controlling apparatus 404. The operation menu information may be changed according to the type of a public device, and may be a group including options that are selectable by a user. If the operation menu information is displayed in 422, the user may select an option for controlling an operation of a public device from among the options, in 424. For example, a method of controlling a public device may be a method of controlling a public device according to a program stored in the public device, a method of directly controlling in a central controller, and the like.

The method of controlling a public device according to a program stored in the public device may not correspond to a situation change. That is, because this method is performed under an assumed general situation, the method may not be able to handle an abnormal situation that is not considered in the program. This method of directly controlling in a central controller disregards a user's request. Accordingly, a public device is controlled by the central controller without reflection of a user's request, and thus, users may have complaints and the public device may be used less.

Thus, there is a need for a method of controlling a public device in order to reflect the requests of users and satisfy the requests if possible. Accordingly, the above-described problems are overcome by selecting an option for controlling an operation of a public device so that a public service desired by users is provided as described in various examples herein.

In 426, the information for controlling an operation of a public device is transmitted to the public device controlling apparatus 404. In 422, if error message information is displayed instead of the operation menu information, the control of a public device has failed.

In 428, the public device controlling apparatus 404 checks whether the information for controlling an operation of a public device is transmitted, in 426. If the public device controlling apparatus 404 detects the information for controlling an operation of a public device, the public device controlling apparatus 404 receives the information for controlling an operation of a public device.

In 430, the information for controlling an operation of a public device is sorted according to a public device by the sorter 336. An example of the sorting is described with reference to FIG. 6.

Figure 6:
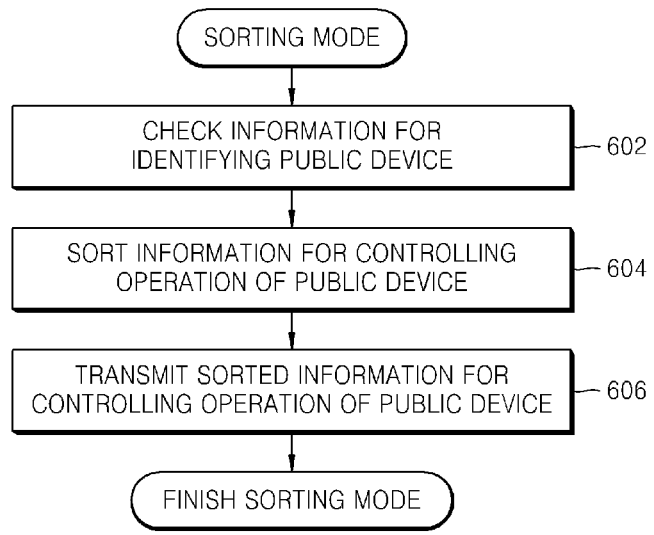
FIG. 6 is a flowchart illustrating an example of a sorting mode corresponding to an operation of FIG. 4.

FIG. 6 illustrates an example of a sorting mode corresponding to operation 430 of FIG. 4. In 602, the sorter 336 identifies the information for identifying a public device from the information for controlling an operation of a public device, which is received from the user terminal 402. For example, in order to check a public device corresponding to the information for controlling an operation of a public device that is received from the user terminal 402, the information for controlling an operation of a public device is extracted and checked. In 604, the information for controlling an operation of a public device is sorted. In 606, the sorter 336 transmits the sorted information. For example, the sorter 336 may transmit the sorted information to the database 338 and the database 338 may store the sorted information, or may transmit the sorted information to the data stream generator 334 so that the data stream generator 334 may generate information about a public device corresponding to the sorted information in the form of a data stream.

Referring again to FIG. 4, in 432, the data stream generator 334 generates a plurality of pieces of information for controlling an operation the public device 406. An example of generating information for controlling the operation of a public device is described with reference to FIG. 7.

Figure 7:
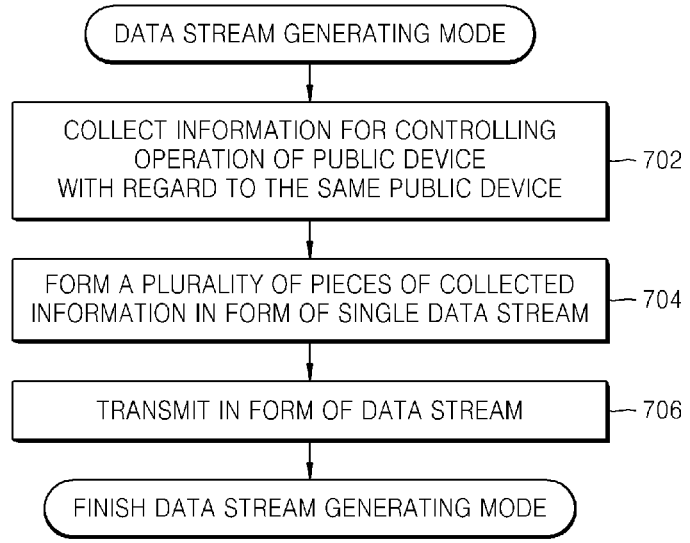
FIG. 7 is a flowchart illustrating an example of a data stream generating mode corresponding to an operation of FIG. 4.

FIG. 7 illustrates an example of a data stream generating mode corresponding to operation 432 of FIG. 4. In 702, a plurality of pieces of information for controlling an operation of the public device 406 are collected with regard to the same public device. In 704, the collected pieces of information are generated in the form of a single data stream. In 706, the information in the form of a data stream is transmitted. For example, the information may be transmitted to and stored in a database, or may be transmitted to a determination unit, and may be used to determine final control information. If the determination unit 342 is installed in the public device 406, the information in the form of a data stream may be transmitted to the communication unit 332 so as to be transmitted to the public device 406.

In 434, the determination unit 342 determines the final control information using the information in the form of a data stream about the public device 406. An example of determining the final control information is described with reference to FIG. 8.

Figure 8:
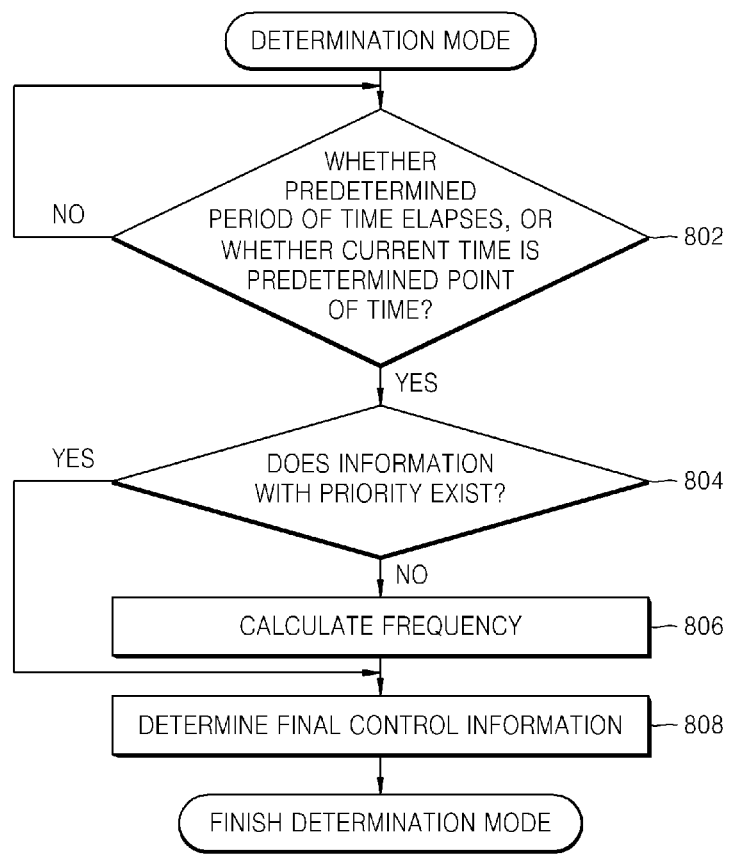
FIG. 8 is a flowchart illustrating an example of a determination mode corresponding to an operation of FIG. 4.

FIG. 8 illustrates an example of a determination mode corresponding to operation 434 of FIG. 4. In 802, the determination unit 342 checks whether a current time is a predetermined point of time, or whether a predetermined period of time elapses after the final control information is determined, and then the determination unit 342 determines to start a process of determining final control information. The information for controlling an operation of a public device may have priority. In this example, information with priority may be information that is not requested by a user and is information for controlling an operation of a public device of an outsider that has an authority to control the public device 406. Because an inappropriate control result of the public device 406 may be caused if people inappropriately select information, the public device 406 may be controlled prior to the selection by people. In 804, it is checked whether information with priority exists in the information in the form of a data stream. In 806, when the information with priority does not exist, information for controlling an operation of a public device, which is selected by most users, is determined. In 808, the information with priority or information with second priority may be determined as final control information.

Without an operation of determining the final control information, all information for controlling an operation of a public device that is transmitted from the user terminal 402 may accumulate while the information for controlling an operation of a public device is reflected to the public device 406.

In 436, the public device controlling apparatus 404 transmits the final control information to the public device 406.

In 438, the communication unit 352 of the public device 406 receives the final control information from the communication unit 332 of the public device controlling apparatus 404.

In 440, the final control information is transmitted to the device controller 354 of the public device 406.

In 442, the device H/W 356 of the public device 406 operates according to an instruction of the device controller 354.

In 444, the information indicating a result of controlling an operation of a public device is transmitted to the communication unit 352 of the public device 406 so as to be transmitted to the public device controlling apparatus 404.

In 446, the public device controlling apparatus 404 checks whether the information indicating a result of an operation for controlling a public device is transmitted from the public device 406. In 446, if the information is transmitted from the public device 406, the public device controlling apparatus 404 receives the information.

In 448, the inserting unit 344 stores the information indicating a result after an operation of the public device 406 is controlled, in the database 338 so that information about a public device is recent information.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to control at least one shared public device that provides a shared public service, the apparatus comprising:
   a receiver configured to receive, from user terminals, pieces of information for controlling an operation of the at least one shared public device, corresponding to a requested public service from the terminals;
   a data stream generator configured to integrate the pieces of information for controlling an operation of the at least one shared public device, and for generating the information in the form of a data stream;
   a determination unit configured to analyze the information in the form of the data stream generated by the data stream generator and to determine final control information that is used to control an operation of the at least one shared public device, in consideration of priority and/or a frequency; and
   a transmitter configured to transmit the final control information to the at least one shared public device.

2. The apparatus of claim 1, wherein the at least one shared public device comprises public devices, and the apparatus further comprises a sorter configured to sort pieces of information for controlling an operation of the public devices into information for controlling an operation of a public device, prior to generating the information in the form of a data stream.

3. The apparatus of claim 2, further comprising:
   a database connected to the data stream generator and the sorter, the database is configured to transmit and receive information to and from the data stream generator and the sorter, and to store information for identifying the at least one shared public device and operation menu information indicating a list of options for controlling the at least one shared public device; and
   an extractor configured to extract the operation menu information from the database, using the information for identifying the at least one shared public device that is received from a user terminal, and to transmit the operation menu information to the transmitter.

4. The apparatus of claim 3, wherein the transmitter is configured to receive the operation menu information from the extractor, and transmit the operation menu information to the user terminal that transmits the information for identifying a public device.

5. The apparatus of claim 3, further comprising an inserting unit configured to receive information indicating a result of controlling an operation of the at least one shared public device, from the receiver, and to input the information indicating a result of controlling the operation of the at least one shared public device to the database,
   wherein the receiver is configured to receive the information indicating a result of controlling the operation of the at least one shared public device from a public device.

6. The apparatus of claim 5, wherein the receiver is configured to receive an opinion of a user about public services provided by the at least one shared public device, and the inserting unit is configured to receive the opinion of the user from the receiver, and input the opinion of the user to the database.

7. The apparatus of claim 6, wherein the extractor is configured to extract the opinion of the user that is stored in the database, and
   the transmitter is configured to transmit the opinion of the user to the user terminal.

8. A method of controlling at least one shared public device that provides a shared public service, the method comprising:
   receiving, from terminals, pieces of information for controlling an operation of the at least one shared public device, corresponding to a requested shared public service;
   integrating the pieces of information for controlling an operation of the at least one shared public device, and generating the information in the form of a data stream;
   analyzing the information in the form of the data stream to determine final control information that is used to control an operation of the at least one shared public device, in consideration of priority and/or a frequency; and
   transmitting the final control information to the at least one shared public device.

9. The method of claim 8, wherein the at least one shared public device comprises public devices, and the method further comprises sorting the pieces of information for controlling an operation of the public devices into information for controlling an operation of a public device, prior to generating the information in the form of a data stream.

10. The method of claim 9, further comprising:
    storing information for identifying the at least one shared public device and operation menu information indicating a list of options for controlling the at least one shared public device, in a database;
    receiving the information for identifying the at least one shared public device from a user terminal, and extracting the operation menu information from the database, using the information for identifying at least one shared public device; and
    transmitting the operation menu information indicating a list of options for controlling at least one shared public device to a transmitter.

11. The method of claim 10, wherein the information for identifying at least one shared public device is obtained using the user terminal.

12. The method of claim 9, further comprising:
    receiving information indicating a result of controlling an operation of the at least one shared public device from a public device; and
    inputting the information indicating the result of controlling an operation of the at least one shared public device to a database.

13. The method of claim 9, further comprising:
    receiving an opinion of a user about public services provided by the at least one shared public device; and
    inputting the opinion of the user to a database.

14. The method of claim 13, further comprising:
    extracting the opinion of the user that is stored in the database; and
    transmitting the opinion of the user to a user terminal.

15. A computer-readable storage medium having stored therein program instructions to cause a processor to implement a method of controlling at least one shared public device that provides a shared public service, the method comprising:

receiving, from terminals, pieces of information for controlling an operation of the at least one shared public device, corresponding to a requested shared public service;

integrating the pieces of information for controlling an operation of the at least one shared public device to generate the information in the form of a data stream;

analyzing the information in the form of the data stream to determine final control information that is used to control an operation of the at least one shared public device, in consideration of priority and/or a frequency; and transmitting the final control information to the at least one shared public device.

\* \* \* \* \*